(12) United States Patent
Browne et al.

(10) Patent No.: US 7,831,319 B2
(45) Date of Patent: Nov. 9, 2010

(54) SENSOR BASED ANTICIPATORY LIGHTING OF CONTROLS

(75) Inventors: Alan L. Browne, Grosse Pointe, MI (US); Nancy L. Johnson, Northville, MI (US); Lawrence E. Peruski, Canton, MI (US); Douglas P. Rheaume, Chesterfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 600 days.

(21) Appl. No.: 11/313,216

(22) Filed: Dec. 20, 2005

(65) Prior Publication Data

US 2006/0155445 A1    Jul. 13, 2006

Related U.S. Application Data

(60) Provisional application No. 60/642,183, filed on Jan. 7, 2005.

(51) Int. Cl.
G05B 15/00 (2006.01)
B60Q 1/00 (2006.01)

(52) U.S. Cl. .............................. 700/83; 701/36; 701/49; 340/438

(58) Field of Classification Search .................. 700/83, 700/17; 701/220, 110, 115, 92, 76, 29, 30, 701/9, 37, 97, 36, 49, 64; 340/438
See application file for complete search history.

(56) References Cited

U.S. PATENT DOCUMENTS

| | | | | |
|---|---|---|---|---|
| 3,731,582 | A * | 5/1973 | Gullickson | .................. 84/478 |
| 4,885,565 | A | 12/1989 | Embach | ...................... 340/407 |
| 5,081,586 | A * | 1/1992 | Barthel et al. | ................. 701/49 |
| 5,086,385 | A * | 2/1992 | Launey et al. | ................. 700/83 |
| 5,113,427 | A * | 5/1992 | Ryoichi et al. | ............... 340/7.1 |
| 6,028,537 | A * | 2/2000 | Suman et al. | ............... 340/988 |
| 6,226,389 | B1 * | 5/2001 | Lemelson et al. | ........... 382/104 |
| 6,275,231 | B1 * | 8/2001 | Obradovich | ................ 345/156 |
| 6,289,332 | B2 * | 9/2001 | Menig et al. | ................... 707/1 |
| 6,542,077 | B2 * | 4/2003 | Joao | ...................... 340/426.16 |

(Continued)

FOREIGN PATENT DOCUMENTS

DE    20202439 U1 * 11/2002

(Continued)

OTHER PUBLICATIONS

Notification of Transmittal of the International Search Report and the Written Opinion of the International Searching Authority, or the Declarations, date of mailing Sep. 27, 2007.

*Primary Examiner*—Ryan A Jarrett
(74) *Attorney, Agent, or Firm*—John A. Miller; Miller IP Group, PLC

(57) ABSTRACT

A control system for selectively lighting and/or highlighting a control interface for a specific individual function generally includes at least one sensor for detecting at least one condition; a controller in operative communication with the at least one sensor and the control interface; wherein the controller sends an output signal to the control interface in response to detecting the at least one condition, wherein the output signal is effective to light and/or highlight the control interface for the specific individual function. Methods for operating the control system are also discussed.

20 Claims, 2 Drawing Sheets

U.S. PATENT DOCUMENTS

| | | | |
|---|---|---|---|
| 6,583,720 B1 * | 6/2003 | Quigley | 340/521 |
| 6,772,061 B1 * | 8/2004 | Berthiaume et al. | 701/110 |
| 6,812,833 B2 | 11/2004 | Rothkop et al. | 340/475 |
| 2004/0144911 A1 | 7/2004 | Stam et al. | 250/208.1 |
| 2004/0209594 A1 | 10/2004 | Naboulsi | 455/404.1 |
| 2005/0264891 A1 * | 12/2005 | Uken et al. | 359/606 |

FOREIGN PATENT DOCUMENTS

JP 08-113098 A * 5/1996

* cited by examiner

SENSOR BASED ANTICIPATORY LIGHTING OF CONTROLS

CROSS REFERENCE TO RELATED APPLICATION

This application claims the benefit of U.S. Provisional Patent Application No. 60/642,183 filed on Jan. 7, 2005.

BACKGROUND

The present disclosure generally relates to control interface systems and processes, wherein the control interface is selectively lighted and/or highlighted in response to an input signal from a sensor.

Numerous motor vehicles employ individual vehicle controls to operate specific functions in or out of a vehicle. For example, individual controls can be used to activate, among others, windshield wipers; defrosters; defoggers; heaters for seats; compact disc players; door releases for fuel inlet, the trunk or hood; interior heating ventilation and air control systems; and the like. Very often these controls are located within the interior of the car in close proximity to the vehicle operator and/or other occupants in the vehicle.

Current individual vehicle controls are limited in that the process of locating and operating the control interfaces may be difficult for those who may not be familiar with the vehicle. These control interfaces are generally in the form of a switch, a button, a handle or a knob that is rotated, pushed, and/or pulled. As used herein, the term "control interface" is intended to include all of the various forms that are utilized to actuate an individual control. The vehicle operator (and/or occupant) must first determine which individual control is used for a particular function as well as the control interface for the particular individual control, which can require a certain amount of time before the operator is familiar with the location. This delay can be problematic such as, for example, when weather conditions drastically change the vehicle operator may need to quickly locate and operate the desired individual control. Moreover, it should be noted that similarly functioning control interfaces are not universally located and may vary depending on the make and model of vehicle.

Another limitation of current individual vehicle control interfaces is that the process of locating and operating the control interfaces may be difficult during periods of inadequate lighting, e.g., evening hours. Even upon activation of interior light sources or the backlighting of the control interfaces for the individual controls (i.e., lighting that occurs upon activation of the parking lights or headlights), the particular location of the desired control interface may be difficult to find especially when the operator is not familiar with the vehicle, such as may be the case for new car owners as well as for rental car operators. Although some of these control interfaces may have backlighting that assists in identification during less than ideal lighting conditions as noted above, none of these control interfaces are believed to have on-demand lighting and/or highlighting based upon a specific need, e.g., selective lighting and/or highlighting of windshield wiper control interface during periods of rain. As such, the process of actuating an individual control interface may be more difficult under conditions of limited visibility or increased stress since the control interface must first be located and the operation thereof must be carried out using only the sense of feel.

Accordingly, there remains a need in the art for improved motor vehicle individual control interface systems and processes that provide a means for rapid identification. It would be particularly advantageous if the needs of the driver or the vehicle are anticipated.

BRIEF SUMMARY

Disclosed herein are a vehicle control interface system for selectively lighting and/or highlighting the control interface, a method thereof, and a computer program product for providing sensory anticipatory data. The vehicle control interface system for selectively lighting and/or highlighting a control interface for a specific individual vehicle function comprises at least one sensor for detecting at least one condition; and a controller in operative communication with the at least one sensor and the control interface, wherein the controller sends an output signal to the control interface in response to detecting the at least one condition, wherein the output signal is effective to light and/or highlight the control interface for the specific individual vehicle function.

A method for selectively lighting and/or highlighting a control interface for a particular individual function in a vehicle comprises detecting a condition with at least one sensor to produce at least one condition defining signal; sending the at least one condition defining signal from the at least one sensor to a controller; and sending an output signal from the controller to the control interface in response to receiving the at least one condition defining signal, wherein the output signal is effective to light and/or highlight the control interface.

A computer program product for providing sensory anticipatory data, the computer program product comprises a storage medium readable by a processing circuit and storing instructions for execution by the processing circuit for facilitating a method comprising detecting a condition with at least one sensor to produce at least one condition defining signal; processing the at least one condition defining signal from the at least one sensor and sending an output signal a control interface, wherein the output signal is effective to light and/or highlight the control interface for an individual vehicle control.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

The present disclosure generally relates to individual control interface systems and processes for use in a motor vehicle, and in particular, to control interfaces for individual controls that selectively light and/or highlight in response to a signal from a sensor. As used herein, the term 'sensor' is intended to include any mechanism available in the vehicle that indicates a relevant situation or condition is or has occurred. This includes individual sensors and combinations of, as well as computer algorithms that may provide environmental/situation awareness through additional methods. The terms "lighting and/or highlighting" are intended to include lighting, highlighting or dimming through intensity changes changing light colors, pulsing, or changing the shape characteristics of the light.

Figure 1:
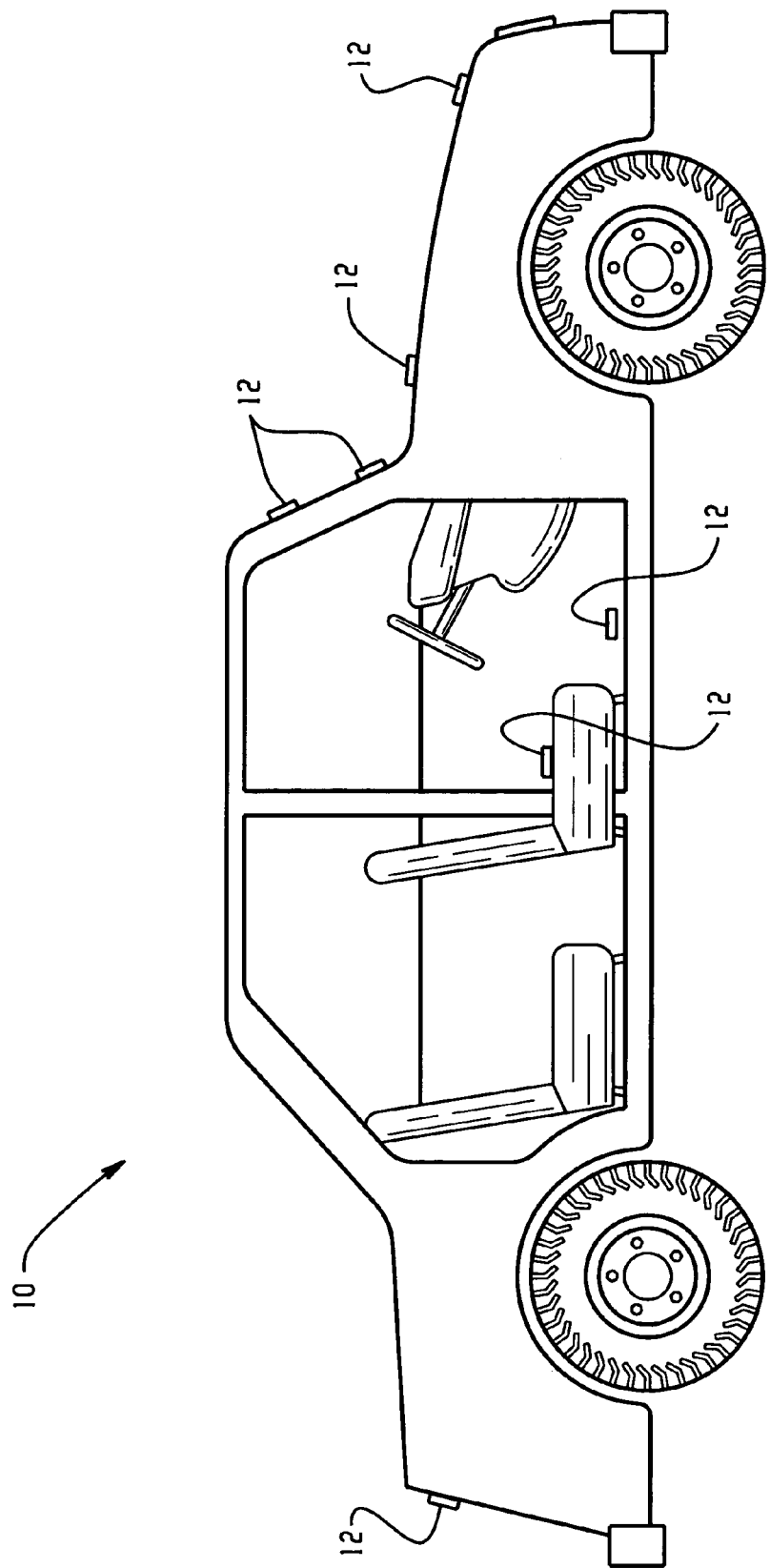
FIG. 1 is a schematic representation of one form of a plurality of sensors located on an automotive vehicle.
Figure 2:
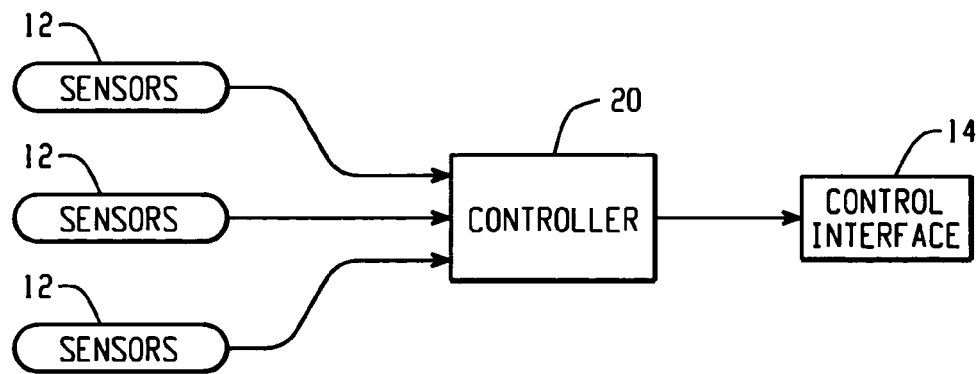
FIG. 2 is a block diagram example one form of operation of the vehicle control system.

Referring now to FIGS. 1 and 2, there is shown a vehicle 10 having a plurality of sensors 12 disposed therein. The present disclosure is not intended to be limited to the number of sensors 12 as shown or their particular location or their type. For example, sensors may be disposed anywhere within and/or about the vehicle including, but not limited to, the interior and exterior of the vehicle. Each sensor 12 generally detects at least one condition to provide an input signal to a controller 20 in operative communication therewith, which further processes the input signal to selectively light and/or highlight a specific control interface 14 for actuating the corresponding individual control in response to the sensed condition. For example, the vehicle may include sensors 12 configured to detect conditions such as lighting, internal or external temperature, moisture, motion, weight, impact, vehicle direction, and the like. The sensors may be electronic based (including telematics and map based), ultrasonic based, electromagnetic based and the like, generally depending on the condition for which it is employed to detect.

One or more of the sensors 12 are in operative communication with the controller 20 for lighting and/or highlighting a control interface utilized for actuating the particular individual control. By way of illustration, a sensor for detecting moisture and/or a photosensor for detecting lighting conditions are in operative communication with a control interface responsible for actuating a windshield wiper. The controller 20 is programmed such that upon receiving an input signal from the sensors (e.g., moisture levels are above a certain threshold), the control interface 14 for actuating the windshield wipers is lit and/or highlighted. The sensors are designed to provide the input signal (i.e., a condition defining signal) to the controller in response to meeting and/or exceeding a predetermined threshold. For example, in the event of rain, the stalk (i.e., the control interface) for actuating the windshield wipers can be selectively lit or highlighted. Whether the control interface is lit or highlighted will generally depend on the other sensor inputs. For example, during daylight operating conditions, the controller 20 may be programmed to light the control interface 14 for the windshield wiper. control in response to the input signal from the moisture sensor. However, in the event that lighting conditions are poor, e.g., evening hours, the control interface 14 for the windshield wiper control may be programmed to be highlighted in response to input signals sent from both the moisture sensor and a photosensor (since the control interface may already be lit as a function of activating the headlights). For highlighting applications, the light intensity for the particular control interface may be programmed to increase, periodically flash, changes colors, or the like. In this manner, the operator is provided with a means for rapid identification and location of the control interface 14 so as to be able to rapidly address the sensed condition.

A variety of suitable sensors are commercially available, which may include, but are not intended to be limited to, a moisture sensor adapted to detect changes in moisture levels such as rain, ice, snow, fog, or humidity; a driver retention sensor adapted to detect seat position, weight of the driver, seat belt usage, motion, heat, and the like; the position of the vehicle doors (open or closed); sensors for detecting whether the ignition is activated or not; temperature sensors; photosensors for detecting lighting conditions; and the like. Other sensors suitable for use in the vehicle control system will be apparent to those skilled in the art in view of this disclosure. As such, the various sensors 12 can be employed and adapted to detect numerous conditions.

The sensors 12 and the particular conditions that are detected are virtually limitless and may be programmed to operatively communicate with the controller 20 to light and/or highlight the control interface 14. As such, various control interfaces for the individual vehicle controls can be lit and/or highlighted in this manner. For example, the vehicle individual control interface system can be used to light and/or highlight control interfaces that control operation of the vehicle windshield wipers, headlights, parking lights, turn signals, defrosters, defoggers, heaters, air conditioners, seat heaters, seat positioners, rear and/or side view mirror positioners, fuel door releases, traction control actuators, vehicle computers, any interlocks (e.g., doors, trunk, hood, and the like), communication devices such as the telephone or advisor communications, media players, and the like. Sensors can also be used to detect various actions by the occupant or operator and light the control interfaces for the next action required/expected in a sequence. In this manner, an additional output signal can be utilized to sequentially (or simultaneously) define the control interfaces to be lit and/or highlighted. Alternatively, the output signal pathway can be programmed based on a learned response by an end user or sensed externally, and lighting and/or highlighting an additional control interface based on the "learned" output signal pathway. Various examples include lighting controls for the seat heater when the interior temperature is low and someone opens the door to enter the vehicle; lighting the control interface for operating a compact disc (CD) of a media player upon insertion of the CD; lighting the control interface for a fuel door release and/or a directional indicator for the fuel door location (which side of vehicle) upon entering a gas station; lighting the control interface for the HVAC system upon entering the vehicle, e.g., light heater controls if the interior cabin temperature is low or light air conditioning controls if the interior cabin temperature is high; lighting the control interfaces for the seat positioners, mirror controls, seat belts, and the like upon opening a vehicle door; lighting the control interfaces for the cruise control, map, telematics upon reaching a predetermined speed such as the state highway maximum speed limit. Other examples could include lighting the control interfaces for the window and child door lock switches upon entry into the rear passenger compartment; light the control interfaces for the light hour and minute of a digital clock in the event of a time zone change or time change (daylight savings time); light the control interface for a telematic system upon a impact event, e.g., light the ONSTAR® control interface, and the like. Other examples will be apparent to those skilled in the art in view of this disclosure.

As shown more clearly in FIG. 2, a block diagram is provided of an exemplary vehicle control interface system. An input signal is provided by at least one of the plurality of sensors 12 to the controller 20, which selectively processes the input signal(s) to light and/or highlight based a control interface 14 upon detecting a condition.

The controller 20 for receiving the input signals from the sensors 12 may be a stand-alone unit or programmed as part of an existing controller for a vehicle. The controller 20 collects data from the sensors 12 and sends output signals accordingly to the appropriate control interface 14 to light and/or highlight the particular control interface. The controller 20 is programmed to define, arrange, and prioritize the various sensor input signals and output functions of the system. The vehicle owner and/or manufacturer may preset the desired sensory input conditions to be collected and the output to be illuminated. The present disclosure is not intended to be limited to any particular controller or its function. For example, the controller may comprise a microprocessor with software, a microcontroller with software, an electronic circuit, a processor with algorithms, and the like.

In one embodiment, the controller 20 selectively receives the input conditions from the plurality of sensors 12 and evaluates it against a programmed threshold. If the input conditions are outside the programmed threshold, the controller 20 selectively sends an output signal to the particular control interface 14 responsive to the input conditions. The programmed threshold can be customized based on an individual's preferences and vehicle. For example, an individual may program the threshold conditions for lighting and/or highlighting the control interfaces for the heater and/or for heating the seat. Of course, one of skill in the art would recognize that the threshold for the particular control interface could be made compatible with memory functions. In another example, the operator may set a lower internal cabin temperature threshold of 60 degrees Fahrenheit (°F.) or any other temperature as may be desired. When the temperature falls below the programmed threshold temperature, the controller sends an output signal effective to light and/or highlight the control interface for the heater and/or for the seat. Of course, the controller may be further programmed to include any ignition status messages for detection of engine activation, which may function in combination with the other sensors so as to minimize drain on the vehicle battery. In this case, the controller can be programmed to light and/or highlight these control interfaces only if the engine is running.

Optionally, the controller 20 may be programmed to include a timer function. The timer function can be employed to light and/or highlight the particular switch for a predetermined period of time depending on the type of condition detected. Once the predetermined time is exceeded, the lighting and/or highlighting of the control interface is disabled and/or reset.

Figure 3:
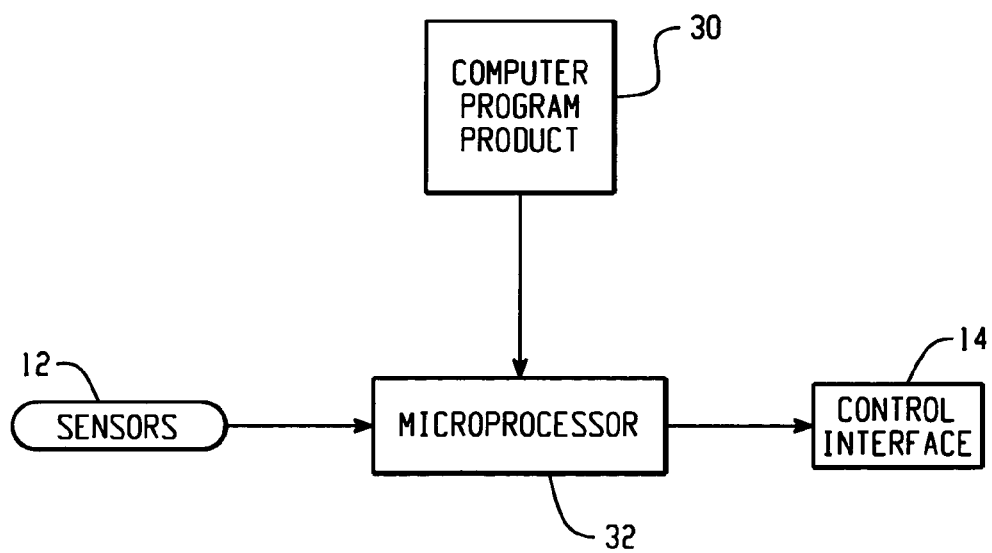
FIG. 3 is a block diagram example illustrating the computer program product used in the vehicle control system.

FIG. 3 illustrates an example of a computer program product, generally designated 30. The computer program product 30 is implemented on a microprocessor 32 used for general-purpose. Segments of the computer program code configure the microprocessor 32 to create specific logic circuits. Since the required functions of each individual stage can be realized by known designs using readily available components, details of the circuitry and structure will not be provided. As shown, the input signals are received from the sensors 12 to the microprocessor 32, which is implemented with the computer program product 30. The microprocessor 32 selectively sends an output signal to the particular switch 14 to light and/or highlight the control interface in response to one or more input signals from the sensors 12.

The present disclosure may be embodied in the form of computer-implemented processes and apparatuses for practicing those processes. Exemplary embodiments may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. An exemplary embodiment may also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure.

Once the control interface is lit and/or highlighted, the controller can be further programmed to deactivate the lighting and/or highlighting. Suitable approaches include programming the controller to deactivate the lighting and/or highlighting of the control interface upon actuation of the switch itself or when the sensor input changes back to its original state. Alternatively, deactivation can be time based as previously discussed. Still further, an override switch can be programmed into the system to provide the operator with the ability to disable the lighting and/or highlighting vehicle control interface system. For example, an operator may be completely familiar with the various switches in the vehicle and may interpret the vehicle control system as a nuisance or distraction. Under circumstances such as these, the vehicle control system may include the override switch. Finally, the controller can be programmed to deactivate and/or reset the lighting and/or highlighting of the control interface upon detection of a secondary condition such as a door open condition, engine off condition, and the like.

By way of example, sensors for detecting temperature and driver presence can provide conditions such as whether an occupant is seated in the driver's seat as well as the internal and external temperatures. Depending on the conditions sensed, the control interfaces for the driver's seat heater and/or the HVAC controls can become selectively lit and/or highlighted. For example, if the seat temperature is below a predetermined threshold value, the control interface for heating the seat can be selectively lit and/or highlighted.

In another example, the media player in a vehicle can include sensors that can detect whether a radio is playing, whether a compact disc or cassette tape is inserted, whether the program played on the compact disc or cassette is at its end, and the like. For example, if there is detection of a compact disc or cassette, the control interfaces associated with control of the cassette or compact disc can be selectively lit and/or highlighted.

In another example, the vehicle can be equipped with pre-impact or impact sensors for detecting an impact event or the prediction of an impact event. Upon detection of the impact event or the prediction of an impact event, the controller can be programmed to light and/or highlight the control interface for assistance and/or the control interface that provides communication with a third party such as ONSTAR® satellite communication system commercially available from General Motors Company.

In another example, one or more sensors are activated when the driver door is opened and an occupant sits down in the driver seat. As a result, the controller will send an output signal effective to light and/or highlight the seat adjustment control interface, the control interface for the side and/or rear view mirrors, and the like control interfaces that are frequently adjusted by an operator upon entry of a vehicle. In this scenario, it may be desirable to program the light for the control interface to deactivate after a predetermined amount of time. As an alternative, the lights for the various control interfaces can be programmed to deactivate when the driver puts the vehicle into gear.

Another example employs a fuel sensor for detecting a fuel pump. The controller can be programmed to light and/or highlight a control interface for releasing the fuel door in response to an appropriate input signal.

Other examples include selectively lighting and/or highlighting the control interface for the air conditioning control in response to detecting an interior cabin temperature greater than a predefined temperature. Likewise, the control interface for the heater controls can be lit and/or highlighted in response to detecting an interior cabin temperature less than a predefined temperature.

In another example, upon opening a vehicle door, sensors can be programmed to detect this movement and provide selective lighting and/or highlighting to the control interfaces responsible for seat adjustment. In this embodiment, turning the ignition, putting the vehicle into gear, or other like event can utilized to program the controller to deactivate the activation signal responsible for lighting and/or highlighting the control interfaces. In a similar manner, upon door opening, the control interfaces for power side view mirrors can be selectively lit and/or highlighted until a preprogrammed event occurs that deactivates the selective lighting and/or highlighting.

The various examples provided herein are merely exemplary and are not intended to be limiting. Other examples may include control interfaces for actuating the windshield wiper controls, the seat heater controls, the radio controls, the CD player controls, individual gauges, the fuel door release controls, the directional arrow for indicating the location of the fuel door, HVAC controls, interior light controls, headlight controls, defogger and defrost controls, side view mirror controls, window controls, door lock controls, cruise controls, information panel, and the like. The vehicle control interface system advantageously provides visual signal alerts to an operator and/or passenger for the switches that control actuation of the corresponding individual controls, thereby providing a means for rapid identification.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A control interface system for selectively lighting and/or highlighting a control interface for a specific individual function, comprising:
   at least one sensor for detecting at least one condition; and
   a controller in operative communication with the at least one sensor and the control interface, wherein the controller sends an output signal to the control interface in response to the at least one sensor detecting the at least one condition, wherein the output signal is effective to light and/or highlight the control interface for the specific individual function where the control interface is lit and/or highlighted in response to the at least one sensor detecting the at least one condition without any operator intervention wherein the control interface for the specific individual function is for addressing the at least one detected condition.

2. The system. of claim 1, wherein the at least one sensor comprises a photosensor, a temperature sensor, a moisture sensor, a weight sensor, an interlock sensor, a fuel sensor, a pre-impact sensor, or an impact sensor.

3. The system of claim 1, wherein the controller evaluates input conditions against a programmed threshold prior to sending the output signal.

4. The system of claim 1, wherein the output signal is adapted to increase light intensity or a change a light color, or periodically vary output of the light intensity.

5. The system of claim 1, wherein the individual function comprises a windshield wiper, a defroster, a defogger, a heater, an air conditioner, a heater for a seat, an adjustment for seat, a rear view mirror, a plurality of side mirrors, a fuel door release, a door release, a communication system, a compact disc player, a cassette tape player, or an ignition key.

6. The system of claim 1, further comprising a timer in operative communication with the controller, wherein the timer is effective to light and/or highlight the control interface for a predetermined period of time.

7. The system of claim 1, further comprising sending an additional output signal to a different control interface in response to detecting the at least one condition.

8. The system of claim 7, wherein sending the additional output signal is sequential to define a multi-step operation.

9. The system of claim 7, wherein sending the additional output signal is simultaneous to define a multi-task operation.

10. The system of claim 7, wherein sending the additional output signal is a learned response based on actions taken by an end user or based on a category of the at least one condition sensed.

11. A method for selectively lighting and/or highlighting a control interface for a particular individual function, the method comprising:
   detecting a least one condition with at least one sensor to produce at least one condition defining signal;
   sending the at least one condition defining signal from the at least one sensor to a controller; and
   sending an output signal from the controller to the control interface in response to receiving the at least one condition defining signal, wherein the output signal is effective to light and/or highlight the control interface where the control interface is lit and/or highlighted in response to the at least one sensor detecting the at least one condition without any operator intervention wherein the control interface for the particular individual function is for addressing the at least one detected condition.

12. The method of claim 11, wherein the at least one sensor comprises a photosensor, a temperature sensor, a moisture sensor, a weight sensor, an interlock sensor, a fuel sensor, a pre-impact sensor, or an impact sensor.

13. The method of claim 11, further comprising deactivating the lighting and/or highlighting of the control interface.

14. The method of claim 13, wherein deactivating the lighting and/or highlighting of the control interface comprises discontinuing the output signal after a predetermined period of time.

15. The method of claim 11, wherein sending the output signal from the controller to the control interface comprises first evaluating at least one condition defining signal against a programmed threshold, and sending the output signal when the at least one condition defining signal exceeds the programmed threshold.

16. The method of claim 11, wherein highlighting comprises increasing a light intensity, changing a light color, or periodically varying a light intensity output.

17. The method of claim 11, wherein the control interface comprises a windshield wiper control, a defroster control, a defogger control, a heater control, an air conditioner control, a heater control for a seat, an adjustment control for the seat, a rear view mirror control, a side mirror control, a fuel door release control, a traction stability control, a computer control, an interlock control, a communication system control, and a media player control.

18. A computer program product for providing sensory anticipatory data, the computer program product comprising:

a storage medium readable by a processing circuit and storing instructions for execution by the processing circuit for facilitating a method comprising detecting at least one condition with at least one sensor to produce at least one condition defining signal; processing the at least one condition defining signal from the at least one sensor and sending an output signal a control interface, wherein the output signal is effective to light and/or highlight the control interface for an individual vehicle function where the control interface is lit and/or highlighted in response to the at least one sensor detecting the at least one condition without any operator intervention wherein the control interface for the individual vehicle function is for addressing the at least one detected condition.

19. The program product of claim 18, wherein the control interface comprises a windshield wiper control, a defroster control, a defogger control, a heater control, an air conditioner control, a heater control for a seat, an adjustment control for the seat, a rear view mirror control, a side mirror control, a fuel door release control, a traction stability control, a computer control, an interlock control, a communication system control, and a media player control.

20. The program product of claim 18, wherein processing the at least one condition defining signal from the at least one sensor further comprises determining an output signal pathway stored by an end user or sensed externally, and lighting and/or highlighting an additional control interface based on the output signal pathway.

* * * * *